(12) United States Patent
Webber et al.

(10) Patent No.: US 7,699,401 B2
(45) Date of Patent: Apr. 20, 2010

(54) APPARATUS AND METHOD FOR ATTACHING SEAT BELT COMPONENTS

(75) Inventors: James L. Webber, Shelby Township, MI (US); Michael T. Moury, Shelby Township, MI (US); David G. Hlavaty, Northville Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 309 days.

(21) Appl. No.: 11/151,157

(22) Filed: Jun. 10, 2005

(65) Prior Publication Data

US 2006/0279130 A1 Dec. 14, 2006

(51) Int. Cl.
B60R 22/00 (2006.01)
(52) U.S. Cl. .................................. 297/469; 24/629
(58) Field of Classification Search .................. 297/468, 297/469; 280/801.1; 24/629, 633, 636, 643, 24/647
See application file for complete search history.

(56) References Cited

U.S. PATENT DOCUMENTS

| | | | | | |
|---|---|---|---|---|---|
| 3,212,152 | A | * | 10/1965 | Akira et al. | 24/647 |
| 3,237,265 | A | * | 3/1966 | Florian | 24/602 |
| 3,765,701 | A | * | 10/1973 | Bowler et al. | 280/807 |
| 4,432,119 | A | * | 2/1984 | Schwark et al. | 24/603 |
| 5,279,021 | A | * | 1/1994 | Edgin | 24/647 |
| 6,141,840 | A | * | 11/2000 | Berkes | 24/633 |

* cited by examiner

Primary Examiner—Joseph F Edell
(74) Attorney, Agent, or Firm—Jimmy L. Funke

(57) ABSTRACT

An anchor for securing seat belt component to a vehicle includes a latch member for securing a tongue portion of the component within a housing. The latch member is movable between a first position wherein a protrusion on the latch member engages the tongue and a second position wherein the protrusion is displaced for releasing the tongue. A biasing member provides a biasing force to maintain the latch in the first position. The housing includes a latch-access area for allowing the latch member to be engaged for manually forcing the latch member to the second position to allow the tongue portion to be removed, so that the anchor does not have a release button.

11 Claims, 9 Drawing Sheets

APPARATUS AND METHOD FOR ATTACHING SEAT BELT COMPONENTS

TECHNICAL FIELD

The present application relates to seat belt components and more particularly the present invention relates to methods and apparatus for securing seat beat components to a vehicle.

BACKGROUND

Seat belt systems comprise two basic elements, a buckle portion and an extendable belt having a clasping portion adapted for removable clasping to the buckle portion. The buckle portion is typically anchored to the vehicle or a seat structure via webbing or a cable or other equivalent means secured to the buckle portion at one end and the vehicle at the other end.

The extendable belt is generally connected to a retraction mechanism that is also anchored to the vehicle or the seat structure depending upon the type of belt being used (e.g., lap belt or shoulder harness). In some shoulder harness applications the retraction mechanism is secured to the vehicle at one point and an end of the belt is secured to the vehicle at another anchor point wherein the clasping portion is slidably received on the seat belt webbing located between the retraction mechanism and the anchor point. In these systems the anchor point is below the occupant at the vehicle to seat interface and the retraction mechanism is at or above the occupants shoulder. Also, the retraction mechanism and the anchor point are on the same side of the seat and the buckle portion is on the other side thus, the belt must be drawn across the seat to be secured to the buckle portion. Accordingly, when the user desires to buckle the seat belt they pull on the belt until a sufficient portion of the webbing is unfurled from the retractor and clasping portion is secured to the buckle portion, which is located at the opposite side of the seat with respect to the anchor point. In addition, vehicle restraint systems also comprise pyrotechnically activated devices such as a pretensioners, which in the type of system described above are located in or below the seat at the same location as the anchor point thus, activation of the pretensioner will cause any seat belt slack at the anchor point to be drawn in by the pretensioner.

In order to secure the webbing of the seat belt to the vehicle at the anchor point, a pneumatic tool is used/required to drive anchor bolts or rivets to into the vehicle or seat frame. However, there typically is not a lot of available room to operate the tools for securing the seat belt at the anchor point. Moreover, in larger vehicles such as mini-vans wherein the seats are removable or relocatable it is undesirable to have one end of the seat belt webbing unremovably anchored to the seat structure, as the same is removable from its locations.

Accordingly, it is desirable to provide a method and apparatus for quickly and rigidly securing the extendable seat belt webbing to a vehicle using a minimal amount of installation tools.

SUMMARY OF THE INVENTION

Disclosed herein are methods for attaching a seat belt webbing to a vehicle the seat belt webbing also having a buckle insert member for releasably engaging a seat belt buckle. The apparatus comprises an anchor configured for engaging and securing a tongue portion to the anchor, the tongue portion being coupled to a seat belt webbing portion. The anchor comprises: a housing defining a receiving area; a biasing member secured to the housing, the biasing member being configured for movement between a first position and a second position, wherein the biasing member is configured to provide a biasing force to maintain the biasing member in the first position; a latch member secured to the biasing member, the latch member comprising a protrusion being configured to be received within the receiving area when the biasing member is in the first position, wherein the protrusion is displaced from the receiving area when the biasing member is in the second position; a mounting aperture disposed in the housing, the mounting aperture being configured to receive a mounting member therein; and wherein the anchor does not have a release button for moving the biasing member to the second position.

A seat belt system for a seat of a vehicle, the seat belt system comprising: a seat belt webbing removably secured to a retractor at one end and having an extended end with a tongue portion secured thereto; a quick connect mechanism for anchoring the extended end to the vehicle, the quick connect mechanism comprising: a housing defining a receiving area; a biasing member secured to the housing, the biasing member being configured for movement between a first position and a second position, wherein the biasing member is configured to provide a biasing force to maintain the biasing member in the first position; a latch member secured to the biasing member, the latch member comprising a protrusion being configured to be received within the receiving area when the biasing member is in the first position, wherein the protrusion is displaced from the receiving area when the biasing member is in the second position, and the protrusion engages an engagement opening of the tongue portion when the tongue portion is inserted into the receiving area; a mounting aperture disposed in the housing, the mounting aperture being configured to receive a mounting member therein, the mounting member securing a cable to the housing, the cable being secured to the vehicle at an opposite end; and wherein the anchor does not have a release button for moving the biasing member to the second position.

A method for securing a tongue member of a seat belt webbing to a vehicle, the method comprising: inserting a portion of the tongue member into a receiving area of a housing of an anchor; moving the tongue member within the receiving area until the tongue member contacts a protrusion portion of a latch member movably secured to the housing by a biasing member; moving the protrusion portion with the tongue member until the protrusion portion is moved from a first position to a second position wherein the protrusion portion is displaced from the receiving area and an opening in the tongue member substantially aligns with the protrusion portion, where the protrusion portion is urged by the biasing member back to the first position and a surface of the protrusion portion engages a surface of the opening of the tongue member to securely retain the tongue member in the receiving area; and wherein the anchor does not have a release button for moving the biasing member to the second position.

DETAILED DESCRIPTION OF EXEMPLARY EMBODIMENTS

Disclosed herein are methods and apparatus for attaching seat belt webbing within a vehicle. More particularly, exemplary embodiments are directed to an anchor or quick connect mechanism that provides a secure attachment point for attaching a seat belt tongue thereto when the tongue is secured to an extendable webbing portion of the seat belt system. In accordance with an exemplary embodiment the anchor or quick connect mechanism is configured to provide a quick connect securement method for fixedly receiving the tongue without the use of pneumatic tools in small areas. In addition, the anchor provides a means for allowing a vehicle seat to be removed or relocated within a vehicle.

Referring now to FIGS. 1-4, a seat belt attachment assembly 10 is illustrated for use with a vehicle seat 11. In accordance with an exemplary embodiment of the present invention, attachment assembly 10 comprises a cable 12, an anchor or a quick connect mechanism 14 for securing a webbing portion 16 to the vehicle via cable 12.

Figure 1:
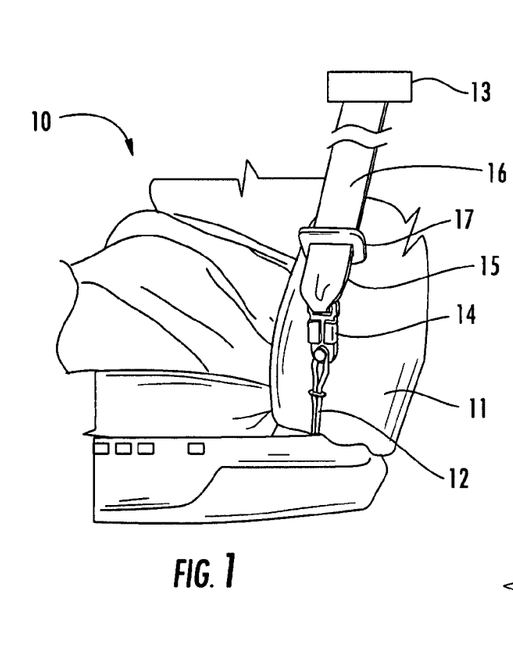
FIG. 1 is an installation view of a seat belt with an anchor or quick connect mechanism in accordance with an exemplary embodiment of the present invention in a stowed position.
Figure 2:
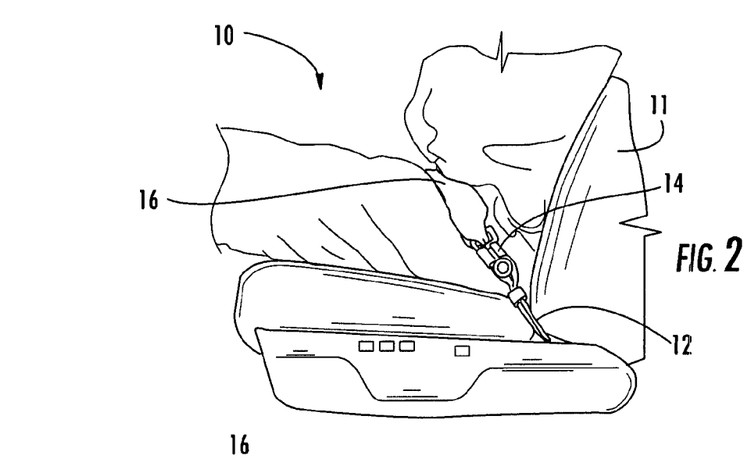
FIG. 2 is an installation view of a seat belt with an anchor or quick connect mechanism in accordance with an exemplary embodiment of the present invention, in an operating position.

Seat belt components, such as buckles, tongues, or latches generally have a buckle secured to the vehicle and an extendable webbing portion having an insert member or tongue adapted for releasably engaging the buckle. In some systems and as illustrated in FIGS. 1-3 webbing portion 16 is secured and unwound from a retractor 13 (illustrated schematically), which is disposed at or above the shoulder of the occupant and an end portion 15 is secured to the vehicle or the vehicle seat, while a buckle insert member, latch plate, or tongue 17 is slidably secured thereto.

Figure 3:
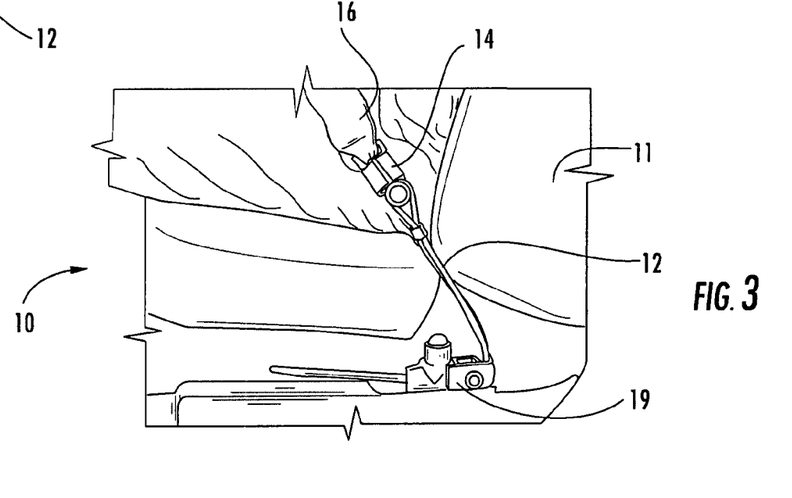
FIG. 3 is an installation view of the anchor or quick connect mechanism of FIG. 2 showing a pretensioning device.

In addition and as illustrated in FIG. 3, a pretensioning device 19 is secured to the end portion. Thus, pretensioning device 19 and the retractor are secured to the same side of the vehicle seat while the buckle for the tongue 17 is on the other side of the seat. As mentioned above, it is desirable to provide a quick and efficient means for securing end portion 15 to the vehicle or vehicle seat without having to use power tools. In addition, and as an optional feature wherein pretensioning device 19 is an integral part of the removable seat there is a need to provide a means for disconnecting end 15 from the vehicle seat to allow it to be removed or relocated. This need may also exist when the pretensioning device is secured to the vehicle and end 15 and cable 12 is routed through the vehicle seat and the seat cannot be removed without disconnecting the end 15 from cable 12.

In accordance with an exemplary embodiment anchor or quick connect mechanism 14 provides a secure location at which end 15 can be quickly and securely attach thereto while in some alternative exemplary embodiments also providing a means for disconnecting from webbing 16. In an exemplary embodiment, webbing 16 is retractably secured to retractor 13 and anchor or quick connect mechanism 14 while tongue 17 provides a means for connecting seat belt webbing 16 to a seat belt buckle (not shown) disposed on the other side of the seat. As illustrated a seat belt component such as a tongue 17 is slidably secured to webbing 16 while end 15 is secured to a tongue 26. In accordance with an exemplary embodiment tongue 26 is configured to be latched to anchor or quick connect mechanism 14.

Examples of pretensioning mechanisms (e.g., retractors and pretensioners for seat belt buckles, seat belts and seat belt anchors) are found in the following U.S. Pat. Nos. 6,340,176; 6,513,747; and 6,572,147 the contents of which are incorporated herein by reference thereto. U.S. Pat. No. 6,725,509, also incorporated herein by reference thereto, illustrates a seat belt buckle. U.S. Pat. No. 6,438,810 also incorporated herein by reference thereto, illustrates a seat restraint buckle assembly also designed for use with seat belt pretensioners that when deployed will cause the seat belt buckle to experience very high accelerations and very rapid decelerations.

FIG. 1 illustrates anchor or quick connect mechanism 14 and webbing 16 in a stowed or non-operational position, when the vehicle occupant is not using the seat belt component. FIG. 2, illustrates anchor or quick connect mechanism 14 and webbing 16 in an operational position wherein tongue 17 and webbing 16 and anchor or quick connect mechanism 14 is drawn across the lap and shoulder of the vehicle occupant. As illustrated, anchor or quick connect mechanism 14 is fixedly connected to a portion of a vehicle structure via cable 12, which may also be connected to a pretensioning device 19 (illustrated in FIG. 3). As is known in the related arts, pretensioning device 19 provides a means for adjusting the length and tension of cable 12 during a predetermined activation event.

Figure 4:
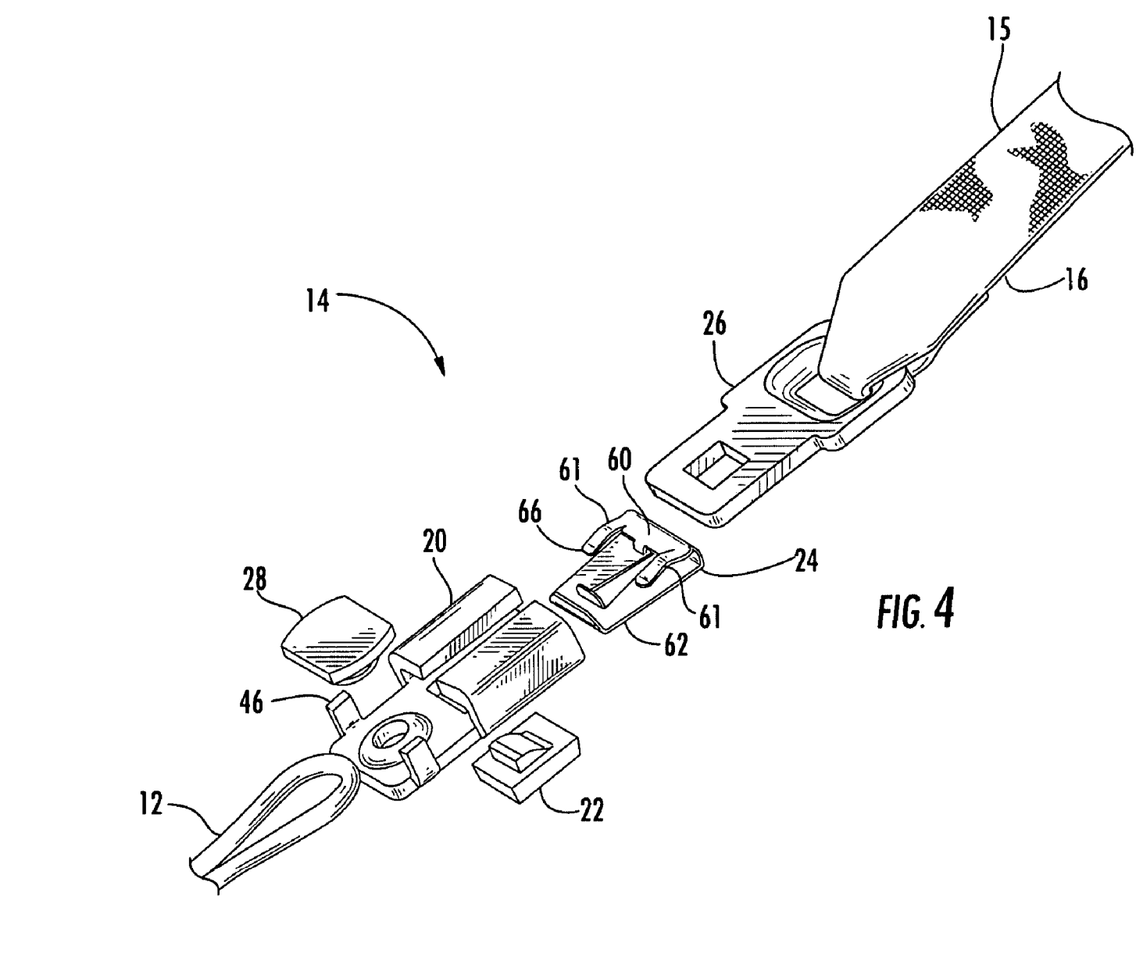
FIG. 4 is an exploded assembly view of an anchor or quick connect mechanism constructed in accordance with an exemplary embodiment of the present invention.

Referring now to FIG. 4, an exploded view of anchor or quick connect mechanism 14 is illustrated. In accordance with an exemplary embodiment anchor or quick connect mechanism 14 comprises a housing 20, a latch member 22, and a biasing member or spring 24, wherein anchor or quick connect mechanism 14 provides a means for quickly securing a tongue member 26 thereto without the need of any tools. A mounting member 28 is configured to fixedly secure housing 20 to an end of cable 12. In accordance with exemplary embodiments components comprising anchor or quick connect mechanism 14 can be made from metal such as steel, or a plastics capable of providing the required tolerances.

In an exemplary embodiment, and now referring to FIGS. 4-7, housing 20 is configured for receiving latch member 22, biasing member 24, mounting member 28, and tongue member 26. Housing 20 includes a receiving area 30 positioned at a tongue receiving end 32 of housing 20. Receiving area 30 is configured to slidably receive a portion of tongue member 26. Receiving area 30 of anchor or quick connect mechanism 14 can be formed by machining and or forming methods including but not limited to stamping. Housing 20 includes a first aperture 34 disposed at a bottom surface 36 of housing 20. First aperture 34 is also configured to receive a portion of latch member 22 wherein the same is in a tongue member engaging position. Housing 20 further includes a second aperture 38 distal first aperture 34. Second aperture 38 is disposed at bottom surface 36 through to an inner surface 40 of housing 20. Aperture 38 is configured to receive mounting member 28 wherein cable 12 is fixedly coupled to housing 20.

Figure 5:
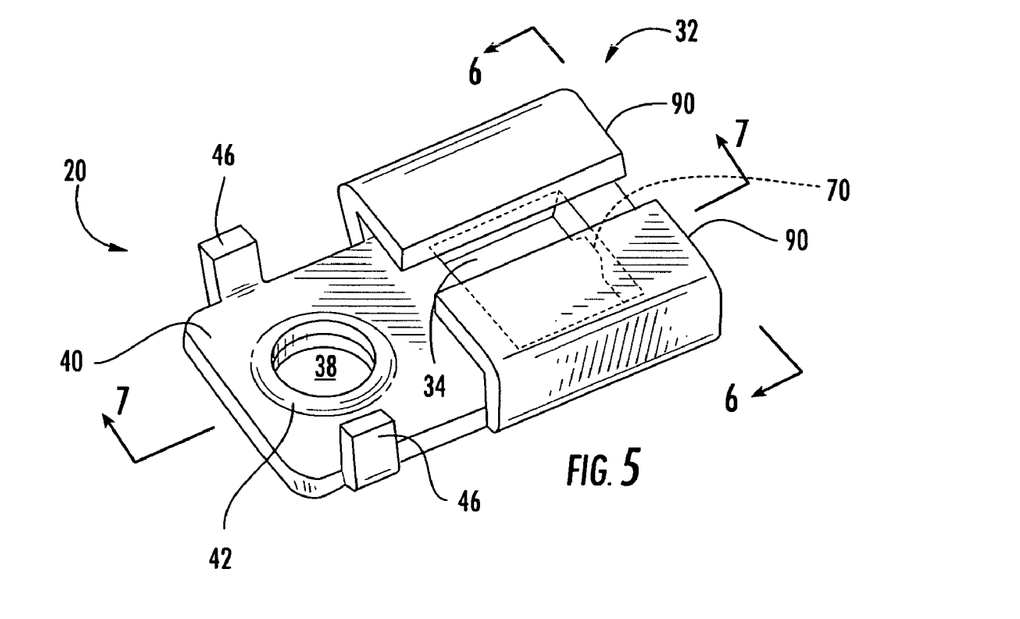
FIG. 5 is a perspective view of a housing of an anchor or quick connect mechanism constructed in accordance with an exemplary embodiment of the present invention.
Figure 7:
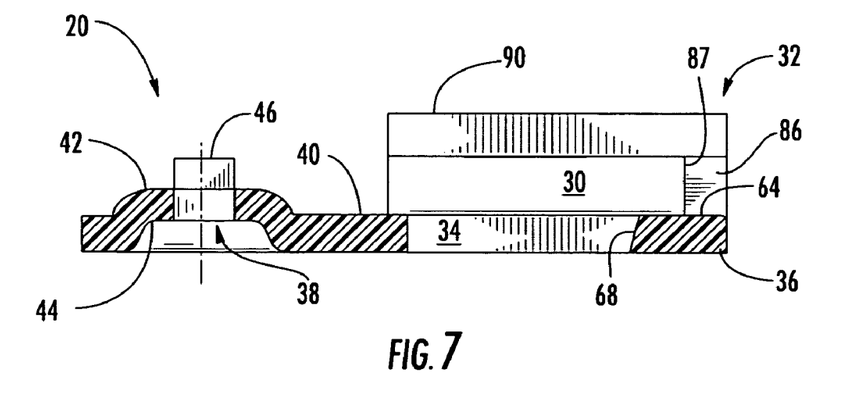
FIG. 7 is a cross-sectional view along lines 7-7 of FIG. 5.
Figure 14:
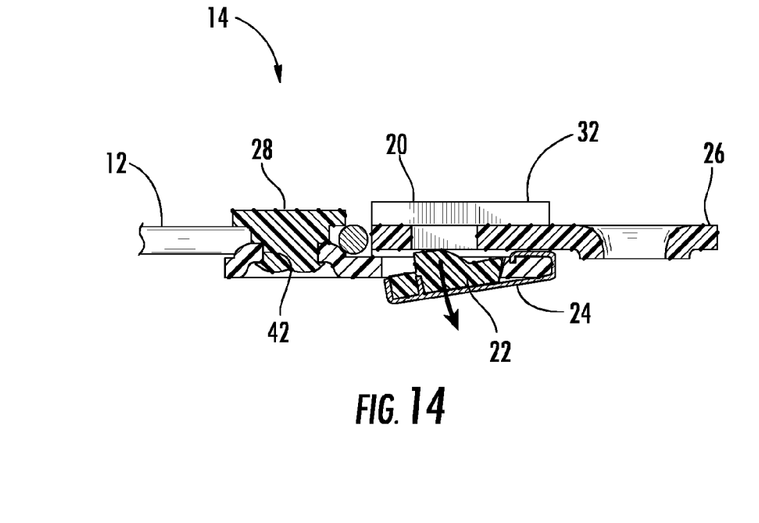
FIGS. 14 and 15 are cross-sectional views illustrating operational position of an anchor or quick connect mechanism in accordance with exemplary embodiments of the present invention.

In alternative embodiments, second aperture 38 and surface 40 can be configured for different types of mounting members or fasteners 28 for connecting cable 12 to housing 20. For instance, and as illustrated in FIGS. 5, 7 and 14, a raised portion 42 of inner surface 40 is disposed proximate to aperture 38. Additionally, aperture 38 can be configured to include a receiving portion 44. In this embodiment, the receiving portion is a countersunk portion of aperture 38. Raised portion 42 and or receiving portion 44 can be incorporated for receiving mounting member 28 so that it does not protrude beyond bottom surface 36 of housing 20. Furthermore, in another alternative embodiment, mounting member 28 is configured as a snap-in type fastener where aperture 38 and or receiving portion 44 are configured to receive the snap-in fastener such that a portion of the fastener locks within aperture 38 between surfaces 36 and 40 of housing 20, illustrated in FIG. 14.

Figure 11:
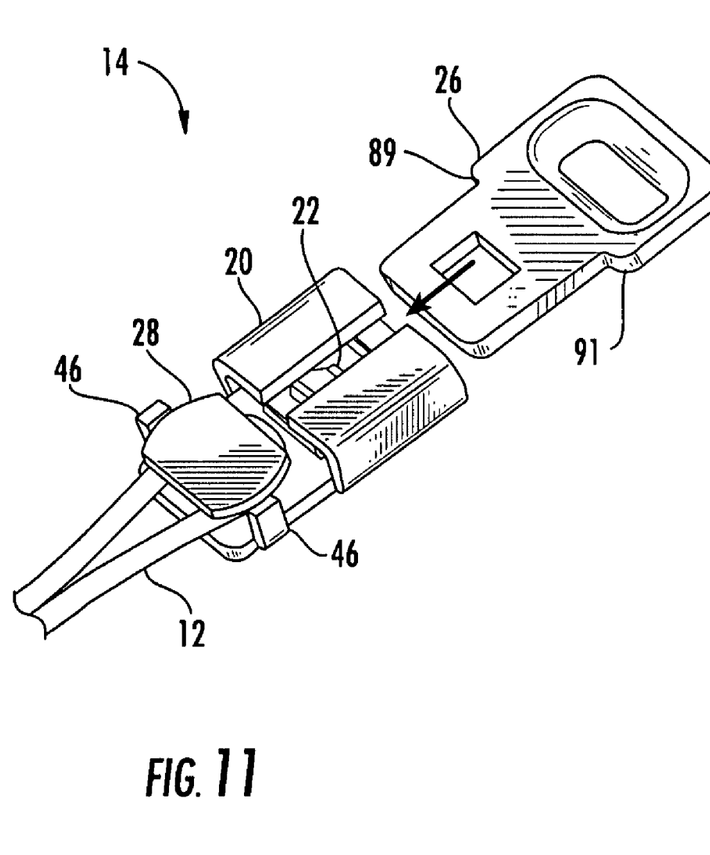
FIG. 11 is a perspective view of an anchor or quick connect mechanism in an unlatched condition.

In another alternative embodiment, housing 20 can be configured to include at least one guide portion 46 proximate second aperture 38. Guide portion 46 is positioned and configured to guide and maintain the end of cable 12 proximate aperture 38. An example of this embodiment is illustrated in FIGS. 5 and 11, where rectangular guide portions 46 are disposed on either side of aperture 38 and depend away from surface 40. In yet another exemplary embodiment illustrated in FIGS. 16 and 18, housing 20 includes a recess 96 positioned and configured to guide and maintain the end of cable 12 proximate aperture 38.

Figure 8:
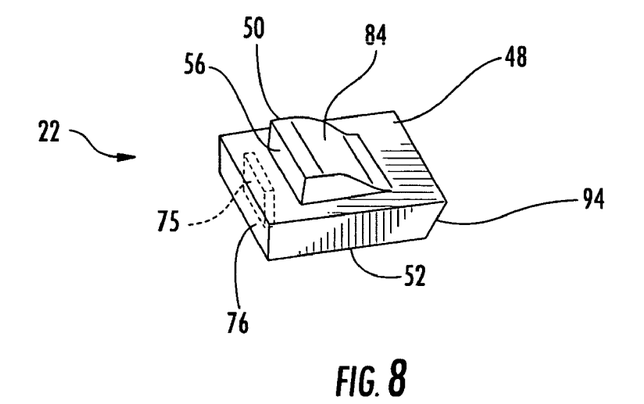
FIG. 8 is a perspective view of a latch member of an anchor or quick connect mechanism constructed in accordance with an exemplary embodiment of the present invention.

Referring now to FIG. 8 an exemplary embodiment of latch member 22 is illustrated. Latch member 22 is configured to be coupled to biasing member 24. Latch member 22 includes a mounting portion 48 and a protruding portion 50. Mounting portion 48 has at least one contact surface 52 configured to be coupled to biasing member 24. Protruding portion 50 depends away from mounting portion 48 and is configured to protrude into the first aperture and receiving area of housing 20 while engaging a latch aperture or an engagement opening 54 of tongue member 26. Protruding portion 50 includes a detent surface 56 configured to engage a front surface 58 of latch aperture 54 of tongue member 26 when the tongue member is disposed in a latched condition as illustrated in FIGS. 12 and 15.

Referring now to FIGS. 9, 13-15, an exemplary embodiment of biasing member 24 is illustrated. Biasing member 24 is configured to slidably couple to housing 20. Biasing member 24 is further configured to fixedly retain latch member 22 and urge latch member 22 into a first position.

Figure 12:
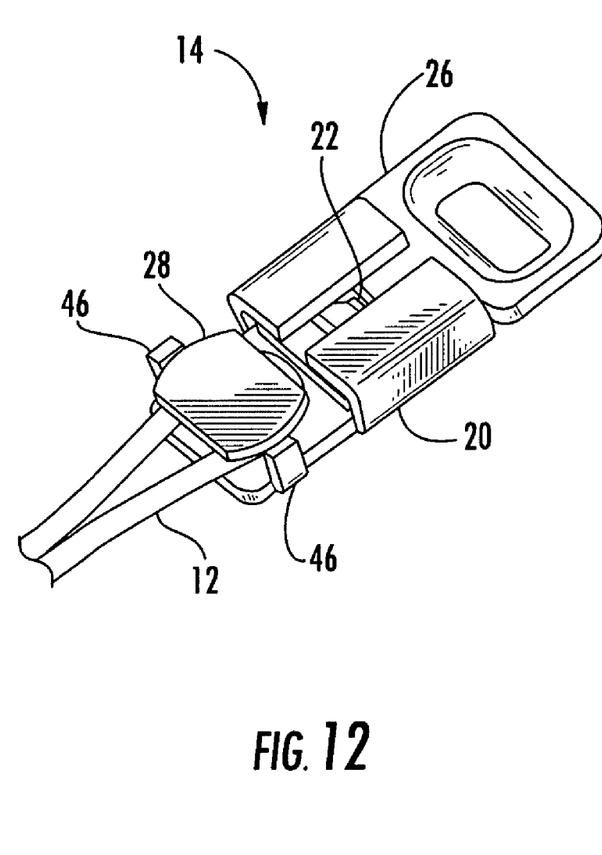
FIG. 12 is a perspective view of an anchor or quick connect mechanism in a latched condition.
Figure 15:
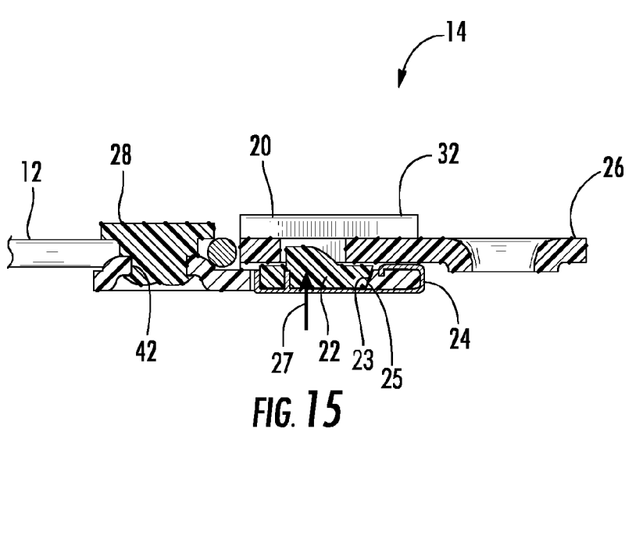

Referring now to FIGS. 11-13, and 15, latch member 22 is illustrated in the first position where protruding portion 50 of latch member 22 is disposed in the first aperture 34 and receiving area 30 of housing 20. The second position is where tongue member 26 translates within receiving area 30 urging protruding portion 50 from receiving area 30, illustrated in FIG. 14 with an arrow. The latched condition, as illustrated in FIGS. 12 and 15, is where tongue member 26 translates within receiving area 30 displacing protruding portion 50 until latch aperture 54 of tongue member 26 aligns substantially with first aperture 34 of housing 20 wherein biasing member 24 urges protruding portion 50 to engage latch aperture 54. An unlatched condition is where latch member 22 is disposed in the first position, illustrated in FIGS. 11 and 13. An unlatched condition also exists when protruding portion 50 has not engaged latch aperture 54 even though tongue member 26 may have moved protruding portion 50.

Figure 9:
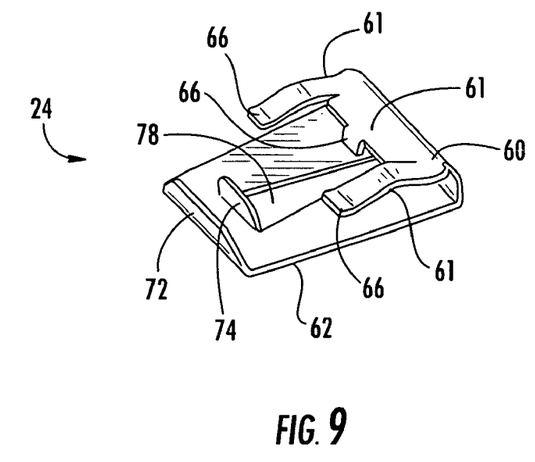
FIG. 9 is a perspective view of a biasing member in accordance with an exemplary embodiment of the present invention.
Figure 13:
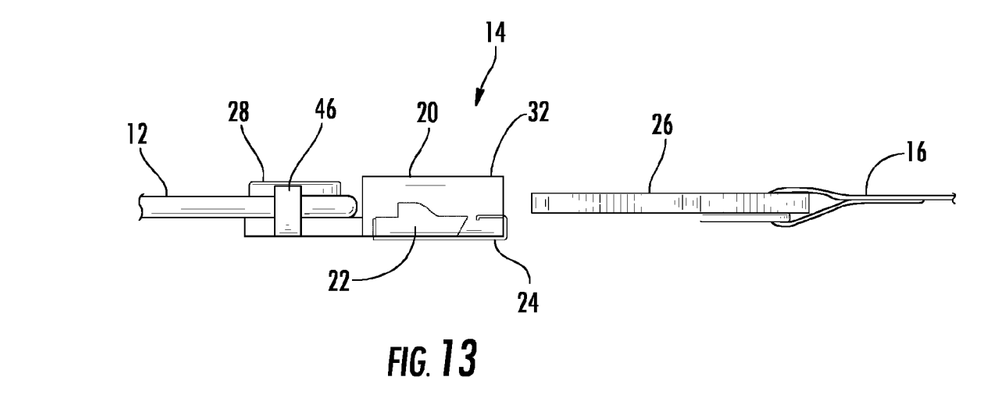
FIGS. 13 is a side view of an anchor or quick connect mechanism in a first position.

Referring now to FIG. 9, biasing member 24 includes at least one engaging portion 60 and at least one latch receiving portion 62 connected to and spaced apart from engaging portion 60. In the embodiment illustrated in FIG. 9, engaging portion 60 comprises a plurality of legs 61 wherein latch receiving portion 62 comprises a single leg 62. Engaging portions 60 and 61 are further configured to slidably couple to inner surface 64 at the tongue receiving end 32 of housing 20, illustrated in FIGS. 13-15. Receiving portion 62 is configured to fixedly retain mounting portion 48 of latch member 22 while engaging portion 60 remains fixed to inner surface 64 of housing 20. Biasing member 24 and latch member 22 are configured such that once biasing member 24 is secured to the housing protruding portion 50 is disposed in the first aperture of the housing (FIGS. 11 and 13). In accordance with an exemplary embodiment biasing member 24 is constructed out of a resilient material such that an urging force into the first position is provided once protrusion 50 is displaced from the housing. In other words biasing member or spring 24 is configured to provide a spring like effect wherein protrusion 50 and biasing member 24 are allowed to be moved or urged by a force from a first position to a second position and then once the urging force is removed the resiliency of the biasing member returns the protrusion back to the first position.

As the tongue member is inserted into the housing the tongue member pushes protruding portion 50 to a position below inner surface 64 illustrated in FIG. 14 and receiving portion 62 and latch member 22 are urged from the first position to the second position by tongue member 26. Once aperture 54 of tongue 26 is aligned with the protruding portion 50 biasing member 24 urges the latch member into an engaging position wherein the protruding portion 50 engages aperture 54 (see FIG. 15). Once engaged as shown in FIG. 15, it is a further feature that latch member 22 comprises a surface 23 that engages a catch surface 25 of housing 20 and is configured so that movement of surface 23 toward catch surface 25 results in movement of the latch member toward receiving area 30 in the direction indicated by arrow 27 and ensures that protruding portion 50 remains engaged within aperture 54 of tongue member 26.

In another alternative exemplary embodiment and as illustrated in FIGS. 4, 5, and 9, the engagement portion of the biasing member has at least one retention portion or tab 66 angularly depending away from portion 60. Tab 66 is configured to engage a portion of a catch surface 68 of aperture 34. In another alternative exemplary embodiment, three retention portions 66 are configured and positioned to engage a portion of catch surface 68. In this embodiment, retention portions 66 prevent biasing member 24 from withdrawing from inner surface 64 of housing 20 once the same is secured thereto. In another alternative exemplary embodiment, catch surface 68 of housing 20 can be further configured to include at least one recess 70 configured to receive retention portion 66 in a manner to further restrain the engagement portion 60 to inner surface 64.

In accordance with an exemplary embodiment, biasing member 24 is configured to retain latch member 22 within the biasing member. For example and referring now to FIGS. 9, 14-15, latch receiving portion 62 is configured to include at least one retaining surface configured to engage and retain latch member 22. As illustrated, a first retaining surface 72 and a second retaining surface 74 depend away from receiving portion 62 and first retaining surface 72 and second retaining surface 74 are configured to contact mounting portion 48 of latch member 22. In this embodiment, a front surface 76 of mounting portion 48 abuts the first retaining surface 72 of the biasing member while second retaining surface 74 is configured to engage an aperture or a recess 75 of mounting portion 48 of latch member 22. In another alternative embodiment, latch receiving portion 62 can include an aperture 78 for allowing the removal of latch member 22 from biasing member 24. In yet another alternative exemplary embodiment, aperture 78 is configured for use with a fastener such as a screw or rivet for connecting mounting portion 48 to latch receiving portion 62.

Figure 10:
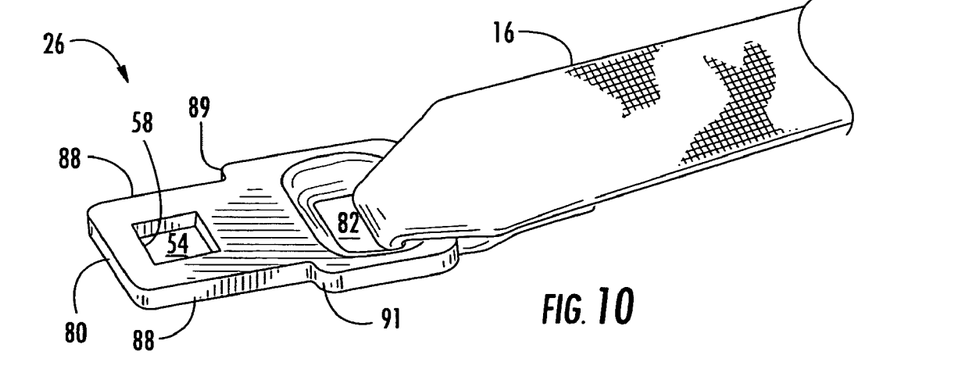
FIG. 10 is a perspective view of a tongue member configured for use with exemplary embodiments of the present invention.

Referring now to FIG. 10 an exemplary embodiment of tongue member 26 is illustrated. Tongue member 26 is configured to be slidably received within receiving area 30 of housing 20. Tongue member 26 includes a leading surface 80, latch aperture 54, and a webbing aperture 82. Leading surface 80 is configured to contact a rear surface 84 of protruding portion 50 of latch member 22 for urging latch member 22 from the first to the second position. Aperture 54 is configured to receive protruding portion 50 of latch member 22 when biasing member 24 biases latch member 22 back to the first position through the first aperture 34 of housing 20. Aperture 82 is configured to receive a portion of webbing 16 to connect the tongue member to the seat belt webbing.

In another alternative exemplary embodiment, leading surface 80 of tongue member 26 and the rear surface 84 of protruding portion 50 of latch member 22 can be correspondingly configured to enable uninterrupted displacement of latch member 22 when it is displaced by tongue member 26 from the first position to the second position. This embodiment is illustrated in FIGS. 4, 8, 10, and 14. Rear surface 84 has a ramped profile that is received by a complimentary sloped leading surface 80 of tongue member 26.

Figure 6:
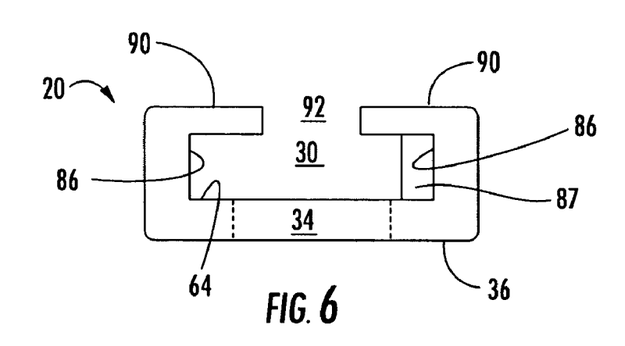
FIG. 6 is a view along lines 6-6 of FIG. 5.

In alternative exemplary embodiments, receiving area 30 and tongue member 26 include configurations wherein tongue member 26 slidably engages receiving area 30 in a specific orientation for the latched condition. This capability is desirable to prevent twisting of webbing 16 as it travels from the retractor to the anchor or quick connect mechanism. A non-limiting example of this embodiment is illustrated in FIGS. 10 and 11 where tongue member 26 includes a first surface 89 and a second surface 91 wherein first surface 89 is disposed closer to aperture 54 than second surface 91. As illustrated in FIGS. 6 and 7 this embodiment includes receiving area 30 having a recessed surface 87. As illustrated in FIGS. 11 and 12, recessed surface 87 and first and second surfaces 89, 91 are positioned and configured so that tongue member 26 can only be disposed in the within receiving area 30 in the latched condition in one orientation. Here, the latched condition (illustrated in FIG. 15) of tongue member 26 is only possible when first surface 89 enters receiving area 30 before second surface 91. This embodiment does not allow tongue member 26 to achieve the latched condition if the tongue member is inserted into receiving area 30 in a reversed orientation. If tongue member 26 is inserted into receiving area 30 in a reversed orientation, first surface 89 will contact an outer surface of housing 20 so that protruding portion 50 will not engage aperture 54 of tongue member 26.

Figure 16:
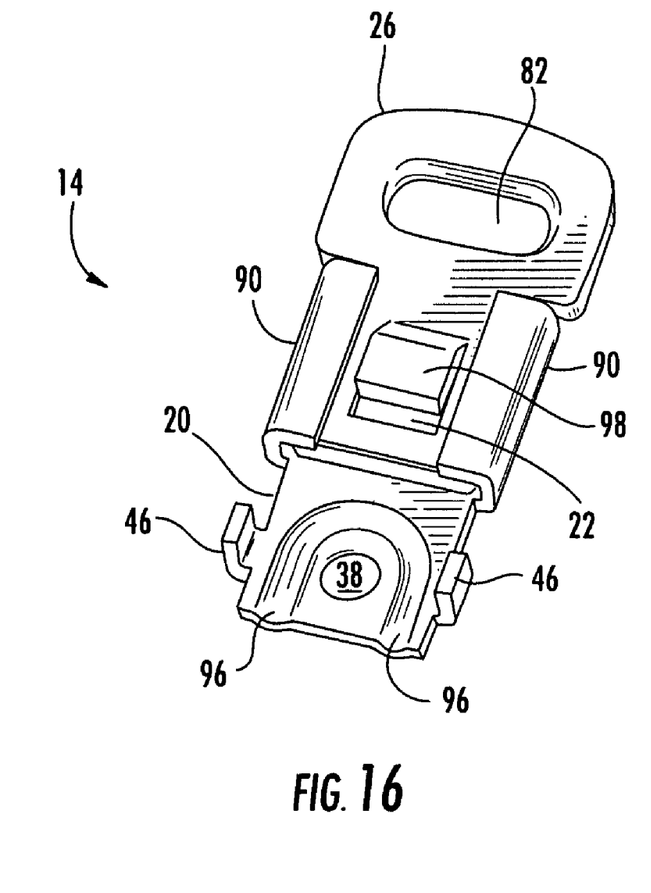
FIG. 16 is a perspective view of an anchor or quick connect mechanism in a latched condition, in accordance with an alternative exemplary embodiment of the present invention.
Figure 17:
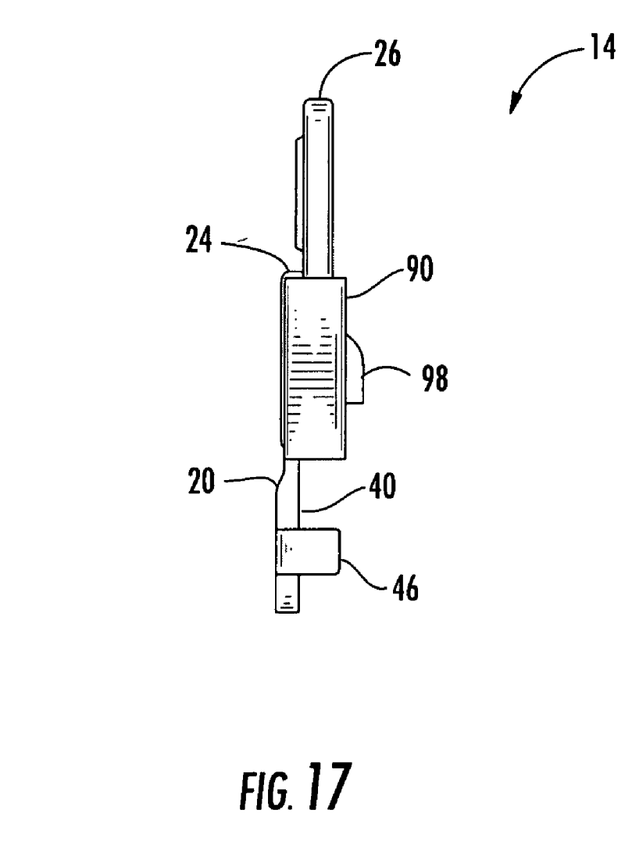
FIG. 17 is a side view along lines 17-17 of FIG. 16.
Figure 18:
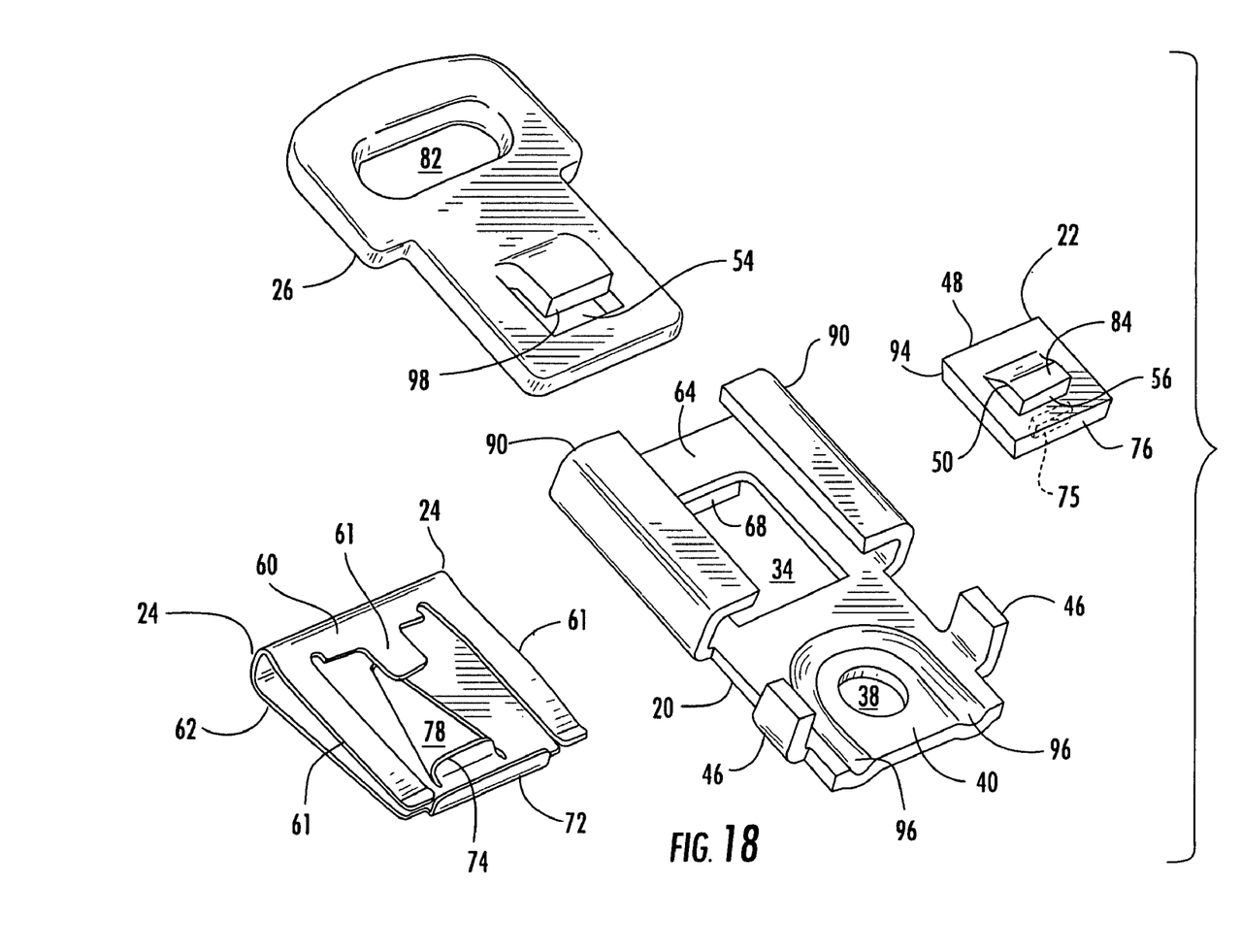
FIG. 18 is an exploded view of the anchor or quick connect mechanism of FIG. 16.
Figure 19:
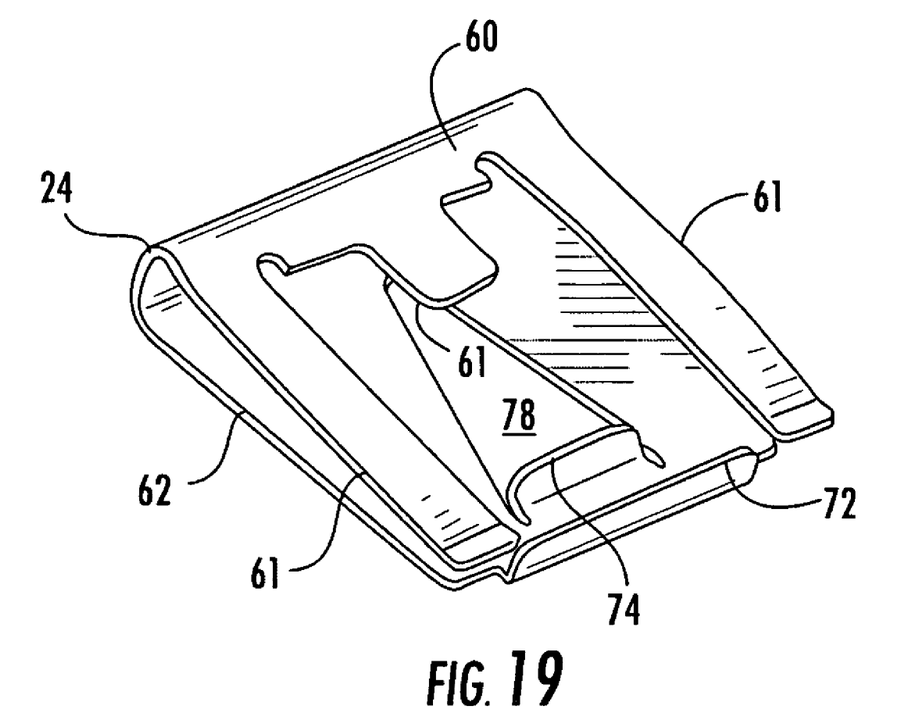
FIG. 19 is a perspective view of a biasing member of the anchor of FIG. 16.
Figure 20:
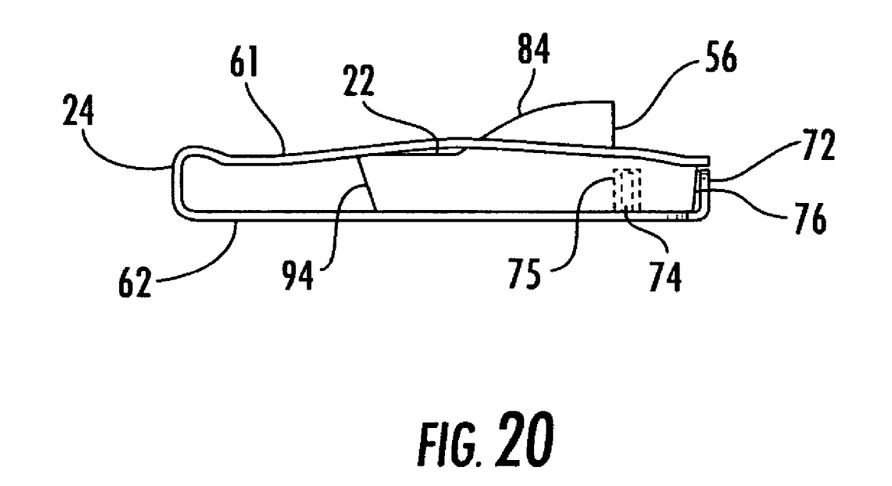
FIG. 20 is a side view of the biasing member of FIG. 19 with a latch member disposed therein.

Another alternative embodiment includes receiving area 30 without recessed surface 87 and having unsymmetrical surfaces 86 configured to receive complimentary side surfaces 88 of tongue member 26. Yet another exemplary embodiment such as illustrated in FIGS. 16-18 include tongue member 26 having a tab portion 98 depending away from a surface proximate latch aperture 54 allowing only one-way engagement of tongue member 26 into receiving area 30.

In one exemplary embodiment and as illustrated in FIGS. 5-7, a pair of L-shaped legs 90 overlap inner surface 64 of housing 20 and define receiving area 30. In this embodiment, receiving area 30 is configured to include a release aperture 92 for insertion of a tool such as a blade of a screwdriver in order to move latch member 22 from the first position to the second position, thereby allowing the release of tongue member 26 from housing 20. As discussed herein this feature allows removal of the seat so that the same can be relocated within the vehicle or completely removed.

In the exemplary embodiment illustrated in FIGS. 5-7, first aperture 34 of housing 20 is rectangular in shape and includes catch surface 68, which comprises a sidewall of aperture 34. Catch surface or sidewall 68 is configured to have an angled surface. Thus, catch surface 68 is configured to contact a complimentary rear surface 94 of latch member 22, which will prevent release of tongue member 26 from receiving area 30 after tongue member 26 has been inserted therein. In the latched condition as illustrated in FIG. 15, and as a tension force is applied to tongue member 26, front surface 58 of aperture 54 contacts detent surface 56 which moves latch member 22 toward catch surface 68. Catch surface 68 and rear surface 94 are correspondingly configured to react to the tension force and maintain engagement of protruding portion 50 within aperture 54 as tension force acts to pull tongue member 26 from receiving area 30. More specifically, as catch surface 68 is pulled against rear surface 94 the latch member will be forced upwardly. Thus, tongue member 26 is fixedly secured to the receiving area of the housing. In a non-limiting example illustrated in FIG. 15, catch surface 68 and rear surface 94 are configured in a slanted, parallel relationship such that catch surface 68 maintains engagement of protruding portion 50 within aperture 54 as the tension force acts to pull the latch member against the housing.

Another alternative exemplary embodiment of the present invention is illustrated in FIGS. 16-20. In this embodiment housing 20 includes recess 96 positioned and configured to guide the end of cable 12 proximate aperture 38. Additionally, tongue member 26 includes tab portion 98 depending away from a surface proximate latch aperture 54. Tab portion 98 is positioned and configured to ensure tongue member 26 slidably engages receiving area 30 in a desired orientation. Furthermore, tab portion 98 can be configured to provide protection for latch member 22 from foreign object intrusion or unintended impact in the latched condition. Here, tab portion 98 overlaps a substantial portion of latch aperture 54. In this exemplary embodiment two outer legs 61 of biasing member 24 are configured to be longer than an inner leg 61 disposed therebetween. In this embodiment the two outer legs 61 provide more engagement contact with inner surface 64 for restraining engagement portion 60 to housing 20.

Exemplary embodiments provided herein provide an anchor attachment that is easily assembled and secured to a cable secured to the vehicle, wherein the anchor or quick connect mechanism is configured to securely receive and fixedly engage a tongue member thereby providing a quick and efficient means for rigidly securing a seat belt buckle to a vehicle.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing room the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. An anchor configured for fixedly securing a tongue portion of a seat belt webbing to a vehicle, the seat belt webbing also having a buckle insert member for releasably engaging a seat belt buckle, the anchor comprising:

a housing defining a receiving area adapted to receive the tongue portion;

a latch member moveable between a first position and a second position, the latch member comprising a protrusion being configured to be received within the receiving area in the first position and adapted for engaging the tongue portion within the receiving area for securing the tongue portion to the anchor, wherein the protrusion is displaced from the receiving area in the second position for allowing the tongue portion to be withdrawn from the housing;

a biasing member for applying a biasing force to said latch member to maintain the latch member in the first position, wherein the biasing member comprises a first leg portion slidably engaging the housing and a second leg portion configured to receive the latch;

a mounting aperture disposed in the housing, the mounting aperture being configured to receive a mounting member therein; and wherein the housing further comprising a latch-access area for allowing the latch member to be engaged for manually forcing the latch member from the first position to the second position to allow the tongue portion to be removed from the receiving area; and wherein the latch member further comprises a surface configured to engage a catch surface of the housing, wherein movement of the surface of the latch member toward the catch surface of the housing results in movement of the latch member toward the receiving area, thereby ensuring that the protrusion remains engaged with the tongue portion.

2. The anchor as in claim 1, wherein the latch member and the biasing member are each configured to be secured to each other by frictional engagement of a mounting portion of the latch member with the biasing member, wherein the biasing member comprises at least one retaining surface disposed on the biasing member, wherein the retaining surface is configured to couple the latch member to the biasing member.

3. The anchor as in claim 2, wherein the latch member further comprises at least one aperture configured to receive at least one retention surface of the biasing member.

4. The anchor as in claim 3, wherein the protrusion further comprises a detent surface configured to retain the tongue portion within the receiving area.

5. The anchor as in claim 1, wherein the tongue portion further comprises a surface positioned and configured so the tongue portion is retained in a latched condition within the receiving area in only one orientation.

6. The anchor as in claim 5, wherein the tongue portion further comprises a second surface, wherein the surface is further configured to slidably enter the receiving area before the second surface.

7. The anchor as in claim 1, wherein the tongue portion further comprises a first surface and a second surface positioned and configured to be slidably received by complimentary surfaces of the receiving area so the tongue portion is retained in a latched condition within the receiving area in only one orientation.

8. The anchor as in claim 7, wherein the first surface and the second surface each depend away from a surface of the tongue portion and overlaps a portion of a latch aperture of the tongue portion.

9. The anchor as in claim 1, wherein the protrusion further comprises a surface configured and positioned to be engaged by a surface of the tongue portion as the tongue portion is inserted into the receiving area, wherein the latch member is displaced from the first position to the second position as the tongue portion moves within the receiving area.

10. The anchor as in claim 1, wherein the first leg portion further comprises at least one retention tab configured to couple the biasing member to a portion of the housing and the first leg portion has a pair of retaining legs.

11. The anchor as in claim 1, wherein the second leg portion further comprises at least one retaining surface configured to couple the biasing member to a portion of the latch member and the protrusion of the latch member is configured to engage an aperture of the tongue portion.

* * * * *